US012770937B2

(12) United States Patent
Files et al.

(10) Patent No.: US 12,770,937 B2
(45) Date of Patent: Oct. 20, 2026

(54) INFORMATION HANDLING SYSTEM BATTERY SWELL DETECTION BY COVER DECK STRESS

(71) Applicant: Dell Products L.P., Round Rock, TX (US)

(72) Inventors: Jace W. Files, Round Rock, TX (US); John Trevor Morrison, Round Rock, TX (US); Chiu-Jung Tsen, Zhubei City (TW)

(73) Assignee: Dell Products L.P., Round Rock, TX (US)

( * ) Notice: Subject to any disclaimer, the term of this patent is extended or adjusted under 35 U.S.C. 154(b) by 347 days.

(21) Appl. No.: 18/380,745

(22) Filed: Oct. 17, 2023

(65) Prior Publication Data

US 2025/0125429 A1 Apr. 17, 2025

(51) Int. Cl.
*H01M 10/42* (2006.01)
*G06F 1/16* (2006.01)

(52) U.S. Cl.
CPC ...... *H01M 10/4285* (2013.01); *G06F 1/1635* (2013.01)

(58) Field of Classification Search
CPC combination set(s) only.
See application file for complete search history.

(56) References Cited

U.S. PATENT DOCUMENTS 5,860,015 A 1/1999 Olson
5,966,284 A 10/1999 Youn et al.
6,449,142 B1 9/2002 Wu
8,422,212 B2 4/2013 Liu et al.
8,634,873 B2 1/2014 Jones et al.
8,917,501 B2 12/2014 Hokugou et al.
9,274,565 B2 3/2016 Tanaka
9,494,976 B2 11/2016 Bates et al.
9,507,385 B2 11/2016 Chen et al.
10,983,170 B1 * 4/2021 Kadirvel ............. H01M 50/204
11,664,667 B2 * 5/2023 Chen ......................... H02H 7/18 361/91.2
2004/0012509 A1 1/2004 Chen
(Continued)

OTHER PUBLICATIONS

U.S. Appl. No. 18/081,061, filed Dec. 14, 2022, entitled "Information Handling System Keyboard Support With Rail Guide Structure Assembly to a Housing Rail," by inventors John Trevor Morrison et al.

*Primary Examiner* — Judy Nguyen
*Assistant Examiner* — James Split
(74) *Attorney, Agent, or Firm* — ZAGORIN CAVE LLP; Robert W. Holland

(57) ABSTRACT

A portable information handling system includes a battery having a battery swell detection sensor to detect predetermined battery swell. In one embodiment, a conductive gasket on the battery upper surface during battery swell presses against sensor on a bottom side of a housing cover to indicate battery swell. In another embodiment, a strains gauge of a resistive foil having first and second terminal detects battery swell that introduces strain to the strain gauge that increases resistance to current passing between the first and second terminals. A processing resource of the information handling system executes instructions to detect the battery swell and to discard battery swell indications associated with inputs at a keyboard or touchpad coupled to the housing cover.

17 Claims, 15 Drawing Sheets

(56) References Cited

U.S. PATENT DOCUMENTS

| | | | | |
|---|---|---|---|---|
| 2004/0190239 | A1 | 9/2004 | Weng et al. | |
| 2005/0184970 | A1 | 8/2005 | Wegert et al. | |
| 2008/0019085 | A1 | 1/2008 | Nakajima | |
| 2008/0174458 | A1 | 7/2008 | Mundt et al. | |
| 2010/0092196 | A1 | 4/2010 | Mimura | |
| 2010/0149741 | A1 | 6/2010 | Liu | |
| 2010/0300159 | A1 | 12/2010 | Berg et al. | |
| 2013/0222993 | A1 | 8/2013 | Iizuka | |
| 2013/0286561 | A1 | 10/2013 | Hokugou et al. | |
| 2013/0308261 | A1 | 11/2013 | Matsumoto et al. | |
| 2014/0042961 | A1* | 2/2014 | Lan | H02J 7/00719 429/61 |
| 2014/0204519 | A1 | 7/2014 | Wu | |
| 2014/0204520 | A1 | 7/2014 | Wu et al. | |
| 2014/0355193 | A1 | 12/2014 | Purcocks | |
| 2015/0189962 | A1 | 7/2015 | Yeo et al. | |
| 2015/0276636 | A1* | 10/2015 | Matsumura | H01M 10/48 324/693 |
| 2016/0011627 | A1 | 1/2016 | Lin | |
| 2016/0231788 | A1 | 8/2016 | Chen et al. | |
| 2017/0098872 | A1* | 4/2017 | Sood | H01M 10/482 |
| 2018/0261824 | A1* | 9/2018 | Ju | H01M 10/48 |
| 2019/0302852 | A1 | 10/2019 | Kitamura et al. | |
| 2020/0203783 | A1* | 6/2020 | Ringuette | G01R 31/392 |
| 2020/0333852 | A1 | 10/2020 | Smith et al. | |
| 2020/0348745 | A1 | 11/2020 | Hamlin et al. | |
| 2021/0223825 | A1 | 7/2021 | Seiler et al. | |
| 2023/0185291 | A1 | 6/2023 | Morrison et al. | |

* cited by examiner

INFORMATION HANDLING SYSTEM BATTERY SWELL DETECTION BY COVER DECK STRESS

BACKGROUND OF THE INVENTION

Field of the Invention

The present invention relates in general to the field of information handling system batteries, and more particularly to an information handling system battery swell detection by cover deck stress.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Portable information handling systems integrate processing components, a display and a power source in a portable housing to support mobile operations. Portable information handling systems allow end users to carry a system between meetings, during travel, and between home and office locations so that an end user has access to processing capabilities while mobile. Tablet configurations typically expose a touchscreen display on a planar housing that both outputs information as visual images and accepts inputs as touches. Convertible configurations typically include multiple separate housing portions that couple to each other so that the system converts between closed and open positions. For example, a main housing portion integrates processing components and a keyboard and rotationally couples with hinges to a lid housing portion that integrates a display. In clamshell configuration, the lid housing portion rotates approximately ninety degrees to a raised position above the main housing portion so that an end user can type inputs while viewing the display. After usage, convertible information handling systems rotate the lid housing portion over the main housing portion to protect the keyboard and display, thus reducing the system footprint for improved storage and mobility.

Information handling systems generally have a stationary or portable configuration. Stationary configurations include desktop and server systems that typically operate in a fixed location with external power and peripherals. Portable information handling systems integrate processing components, a display and a power source in a portable housing to support mobile operations. Portable information handling systems allow end users to carry a system between meetings, during travel, and between home and office locations so that an end user has access to processing capabilities while mobile. Tablet configurations typically expose a touchscreen display on a planar housing that both outputs information as visual images and accepts inputs as touches. Convertible configurations typically include multiple separate housing portions that couple to each other so that the system converts between closed and open positions. For example, a main housing portion integrates processing components and a keyboard and rotationally couples with hinges to a lid housing portion that integrates a display. In a clamshell configuration, the lid housing portion rotates approximately ninety degrees to a raised position above the main housing portion so that an end user can type inputs while viewing the display. After usage, convertible information handling systems rotate the lid housing portion over the main housing portion to protect the keyboard and display, thus reducing the system footprint for improved storage and mobility. Portable information handling systems also operate with peripheral devices, particularly when the end user is in an office or home environment.

Recently, increased reliance on work from home and improvements in processing, storage and networking capabilities for portable information handling systems have resulted in a greater use of portable information systems for personal and enterprise usage scenarios. Mobile use scenarios can result in greater wear and tear on portable information handling systems with large variances in expected life depending on how and where the systems are used. In some situations, batteries, displays and keyboards integrated in portable information handling systems experience little use, such as when the systems are used with a dock and external peripherals, while in other situations these components are used extensively, such as when the systems are used in mobile scenarios. When a portable information handling system fails due to a component failure, many of the remaining components have substantial useable life. Repairing a portable information handling system by replacing failed components helps to reduce commitment of functional components to landfills, to reduce system costs and to reduce environmental impacts. In some instances, the remaining components have experienced variable use so that the remaining life of the repaired system is uncertain and repairing with new components can be inefficient and cost prohibitive. An alternative is to harvest components from a failed information handling system, test the components for remaining life, and then reuse components where justified. Unfortunately, the expense of breaking down information handling systems, testing the components and rebuilding the information handling systems can often prove prohibitive.

One difficulty with reuse of information handling system components is the tracking of remaining life and predicting of future failures. Another difficulty is tearing down the information handling systems to separate out reusable components and then reassembling the components into refurbished or repaired information handling systems. Although reuse of components seems environmentally friendly on a superficial level, the true environmental cost can include a variety of factors related to the manufacture of the components, operational management of manufacturing activities and transportation logistics. One component that tends to wear in portable information handling systems is the hinge that rotationally couples the main housing portion to the lid housing portion. Over time, rotation of the housing portions can wear out the torque engine and other friction parts that help to rotate the housing in an expected manner. Although hinge movement can be tracked to estimate remaining hinge life, the actual wear cannot be readily evaluated without breaking down the information handling system. Even when a given hinge has life remaining, the hinge must match the type of hinge and torque specifications of a replacement housing, which can vary depending upon the system weight and components. Other components have similar wear over time that is difficult to evaluate, such as keyboards key condition, key annotation, and backlights. Battery useful life remaining is also tracked by use at the system, such as with a battery management unit (BMU), however, a battery can suffer physical deformations that can make the battery unusable, such as battery swell.

SUMMARY OF THE INVENTION

Therefore, a need has arisen for a system and method which evaluates information handling system components and subcomponents by telemetry to determine reuse and recycling.

In accordance with the present invention, a system and method are provided which substantially reduce the disadvantages and problems associated with previous methods and systems for evaluation of information handling systems to determine component reuse and recycling. Cameras capture two and three dimensional images of an information handling system to determine component wear for reuse and recycling.

More specifically, an information handling system is placed on a test station in the field of view of one or more cameras that include depth cameras to capture distances. The test station applies an acceleration to the information handling system, such as with a robotic arm, so that cameras capture a response of the housing to the acceleration to support evaluation of a housing hinge's wobble. For instance, hinge wobble is measured based upon an amount of movement that the housing upper portion does in response to the acceleration. The camera telemetry is applied to evaluate the keyboard and touchpad wear, such as the color, material and finish, including the height at which keyboard keys bias in a neutral position. The keyboard evaluation is based in part upon the keyboard language, which is automatically established by a keyboard lattice interaction with a membrane of the keyboard. For instance, the keyboard language impacts the amount of light that a keyboard backlight provides, which can change the keyboard evaluation in how light distributes at different illumination levels for the keyboard backlight. A battery in the information handling system includes a pattern with spaced lines or other shapes that the camera telemetry evaluates to determine battery swell. During operation of the information handling system, battery swell is tracked by a strain sensor and by interaction of the battery with a housing cover and/or keyboard membrane when battery swell causes contact.

The present invention provides a number of important technical advantages. One example of an important technical advantage is that an information handling system is iteratively evaluated by camera telemetry to determine wear for components and subcomponents to efficiently assign reuse and recycling that optimizes system value and reduces manufacture carbon footprint. Camera telemetry is performed in an automated fashion on a test stand to reduce human interactions for a more efficient and timely process. Defined thresholds for component reuse and recycling enforced by automated evaluations provides a highly effective remanufacturing environment.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

A portable information handling system breaks down to reusable components and subcomponents based upon inspection of camera telemetry. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
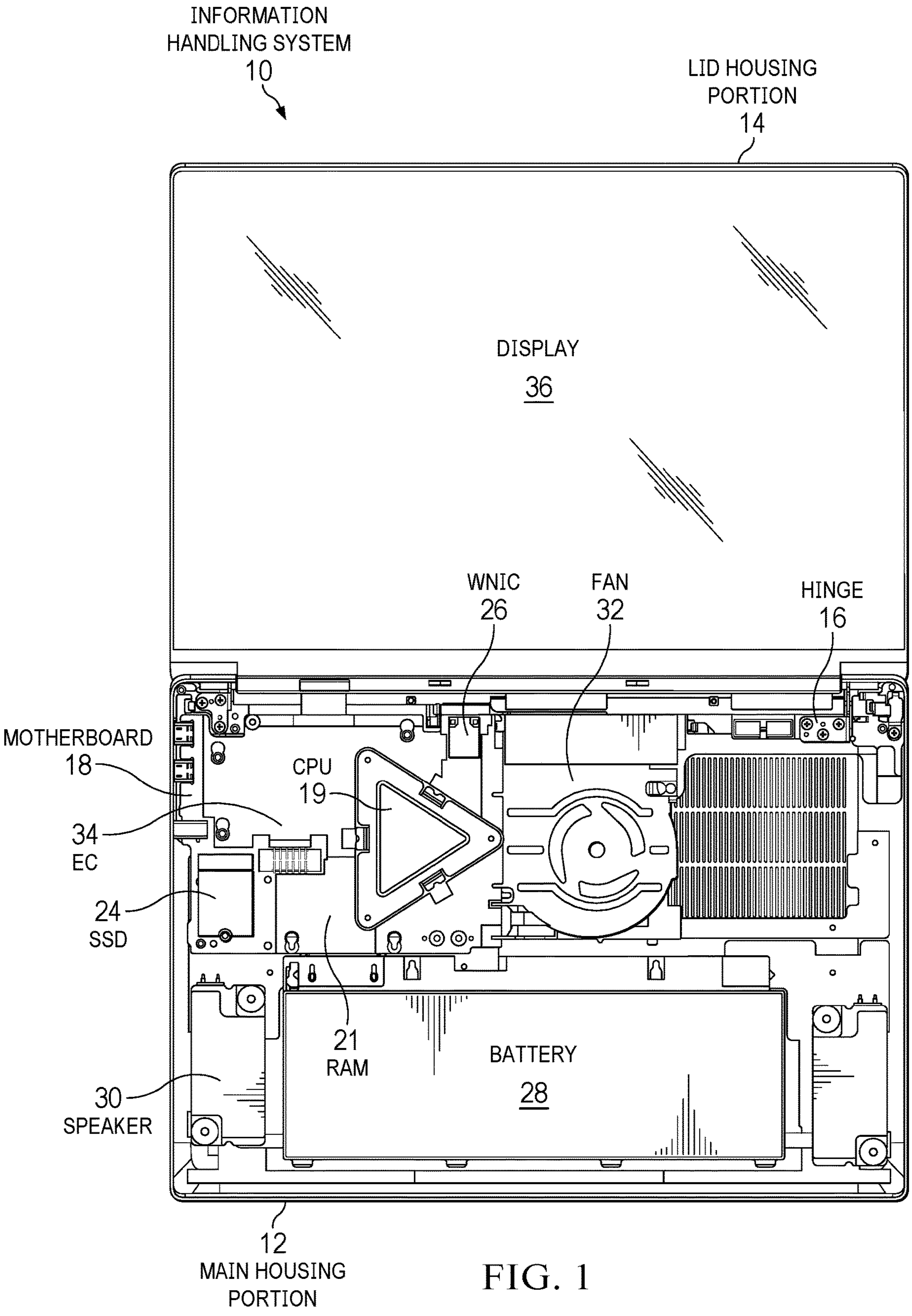
FIG. 1 depicts a portable information handling system configured to break down for reuse and recycling of processing components that cooperate to process information.

Referring now to FIG. 1, a portable information handling system 10 is depicted that is configured to break down for reuse and recycling of processing components that cooperate to process information. Information handling system 10 processes information with processing components disposed in main housing portion 12 that communicate through wirelines of motherboard 18. In the example embodiment, a central processing unit (CPU) 19 executes instructions to process information in cooperation with a random access memory (RAM) 21 that stores the information and instructions. A solid state drive (SSD) 24 provides persistent storage during power down, such as with flash integrated circuits. A wireless network interface controller (WNIC) 26 provides wireless signal communications with peripheral devices and networks A battery 28 stores power to run the processing components when external power is not available. Speakers 30 generate audible sounds for audio information. A cooling fan 32 generates an active cooling airflow that cools the processing components. An embedded controller 34 has an associated flash memory and a processing resource that manages operating conditions within the system, such as application of power, internal thermal conditions and interactions with peripheral devices. Lid housing portion 14 rotationally couples to main housing portion 12 by a hinge 16 to rotate between open and closed positions. A display 36 couples to lid housing portion 14 and interfaces with motherboard 18 to present the information as visual images. As an example, portable information handling system 10 has the features described in U.S. patent application Ser. No. 18/081,061, entitled "Information Handling System Keyboard Support with Rail Guide Structure Assembly to a Housing Rail," by Morrison et al., filed on Dec. 14, 2022, and incorporated herein as if fully set forth.

In the example embodiment, hinge 16 includes a number of features that aid in the assembly, breakdown and reuse of information handling system 10. A modular design of hinge 16 separates each hinge into a fastening portion that couples to a portable housing and a rotational portion that wears over time due to rotation of the information handling system housing portions. The mounting fastening portions couple in a removeable fashion so that a hinge mount can be removed from a housing and reused in a different housing, such as with a wire bundle mounting arrangement. The rotational hinge core fits into the mount and includes a selectable set of characteristics that include torque, rotational detent orientation and rotational stop orientation. This arrangement allows any housing of any footprint to accept a common hinge mount and then configure with a selectable set of characteristics by selection of a hinge core. At end of life for an information handling system, a hinge mount is readily reused since the lack of moving parts reduces wear and the mount fits hinge cores with a wide variety of characteristics. The hinge core breaks down so that friction parts and rotating parts are readily replaced to reuse hinge core parts while worn parts are recycled. In addition, a hinge stop release within the hinge core is accessible from an exterior of an assembled information handling system housing so that the hinge fully rotates to support disassembly of the system, such as release of a display panel from the housing lid and release of a keyboard assembly from the housing main portion. Greater details regarding the example hinge are described in U.S. patent application Ser. No. 18/376,589, entitled "Modular Portable Information Handling System Hinge with Quick Attachment and Detachment," and filed on Oct. 4, 2023 by Sanchez et al., which is incorporated herein as if fully set forth. The present disclosure addresses an evaluation of hinge status before breakdown of information handling system 10 to aid in reuse and recycling decisions for the hinge and for other parts of the system. The evaluation is performed with a visual scan of the system and automated handling as described below, such as a robotic manipulation of information handling systems returned from end users to a remanufacture location.

Figure 2:
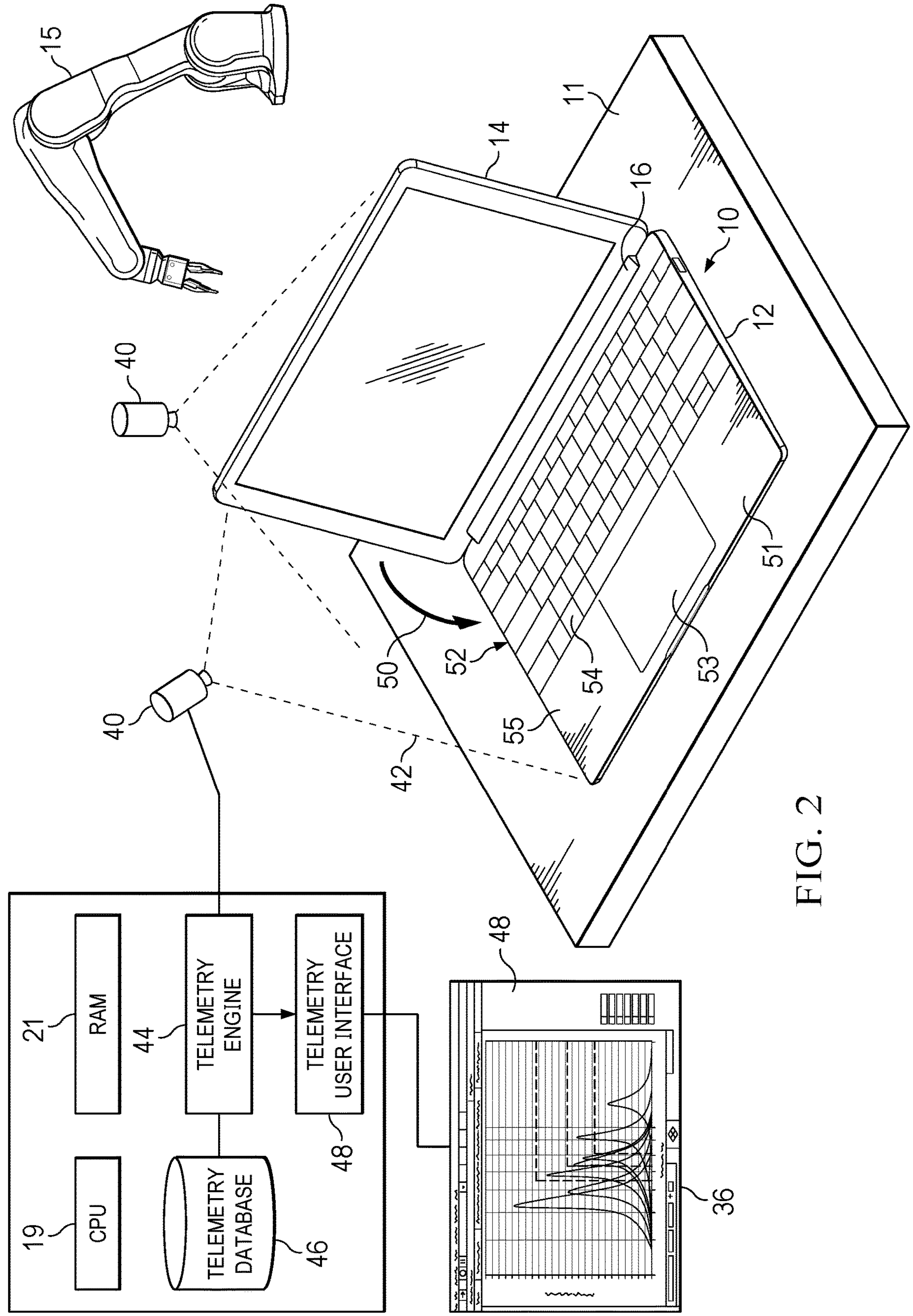
FIG. 2 depicts a portable information handling system resting on a test platform to have a visual inspection that includes an evaluation of the housing hinge for reuse and/or recycling.

Referring now to FIG. 2, a portable information handling system 10 is depicted resting on a test platform 11 to have a visual inspection that includes an evaluation of the housing hinge for reuse and/or recycling. A key to a sustainable circular economy is intelligent, rapid and low-cost evaluation of a returned information handling system to determine a lowest common denominator of reusable component for a breakdown of a system to the system's most valuable elements. In the example embodiment, portable information handling system 10 is assembled in a modular fashion to encourage component reuse and simplify recycling where reuse is not practical. A test platform 11 accepts portable information handling system 10 in an open position having lid housing portion 14 rotated about hinge 16 to an open position relative to main housing portion 12 so that a keyboard 52 and display are exposed in a clamshell position. Cameras 40 have fields of view 42 directed at test platform 11 to capture visual images of portable information handling system 10, such as with visual spectrum and infrared spectrum image sensors. Using two-dimensional and three dimensional visual images, cameras 40 support intelligent telemetry to grade each reusable module in an information handling system to determine the modules' state of health and, based upon the evaluation, determine the extent to which each module is broken down for reuse or recycle subcomponents. The camera telemetry evaluation is repeated in an iterative process to a lowest denominator at which end of life actions have an efficient system application. For example, an information handling system is disassembled in basic harvestable components for reuse until non-reusable subcomponents of common material are available for recycle, such as non-reusable plastic, aluminum, steel, etc. . . .

In the example embodiment of FIG. 2, an automated evaluation system uses telemetry to determine how to breakdown an information handling system so that a hinge component and the hinge's subcomponents provide optimal value for reuse and or recycling. A robotic arm 15 places information handling system 10 in an open position on test platform 11 with a display and an upper housing cover 55 are exposed to have visual images captured by cameras 40. The visual images include images taken with different lighting conditions and images with an infrared time of flight sensor or depth camera so that a full telemetry analysis of the system's condition can be determined. For example, cameras 40 capture two and three dimensional images with the display presenting visual images of different color and brightness and with the keyboard 52 having keyboard backlight illumination of different brightness. A telemetry engine 44 executing on a CPU 19 of test platform 11 references a telemetry database 46 to compare information handling system detected conditions based on telemetry captured by cameras 40 with a threshold standard of components for the system and present the results in a telemetry user interface 48 presented as a graphical user interface of a display of test platform 11. A variety of different test arrangements may be performed to iteratively determine the optimal reuse versus recycling use case for information handling system 10. In addition to the hinge, other components analyzed for reuse and recycling include the display, the keyboard 52 and keyboard keys 54, the cover housing portion 55, the palm rest 51 and the touchpad 53. Examples of these evaluations are described below following a description of hinge 16 evaluation from telemetry.

As depicted in FIG. 2, hinge 16 is evaluated with telemetry by introducing a vibration to the information handling system 10 and then monitoring movement of lid housing portion 14 to determine the amount of torque available at the hinge. For instance, robotic arm 15 or an actuator built into test platform 11 introduces an acceleration of a predetermined amount to portable information handling system 10 and then the position of lid housing portion 14 is measured to determine the amount of movement that hinge 16 allowed. The acceleration 50 may be a one time acceleration or a repeated pattern, such as a sinusoidal vibration that operates at a fixed or variable frequency for a defined time period. Telemetry engine 44 commands the acceleration, determines the threshold at which the hinge passes or fails the evaluation based upon telemetry database 46, evaluates lid housing portion movement compared against the thresholds and presents the evaluation results at telemetry user interface 48. Movement of lid housing portion 14 used to evaluate the condition of hinge 16 may include absolute distance of movement of the housing portion after the acceleration is complete, different amounts of movement where the acceleration is introduced at different housing rotational orientations, and a time response of movement that indicates dampening of the hinge due to torque applied by the hinge. In one example embodiment, hinge torque is tested at detent orientations by moving the housing rotational orientation to a detent orientation with robotic arm 15 and applying the acceleration at the detent orientation. In another embodiment, the condition of hinges on opposing sides of the housing is determined by comparing the motion at each of opposing sides of lid housing portion 14 when the acceleration is applied. For instance, if a right side hinge has greater wear than a left side hinge, then the right side of the lid housing portion will show greater movement.

Figure 3:
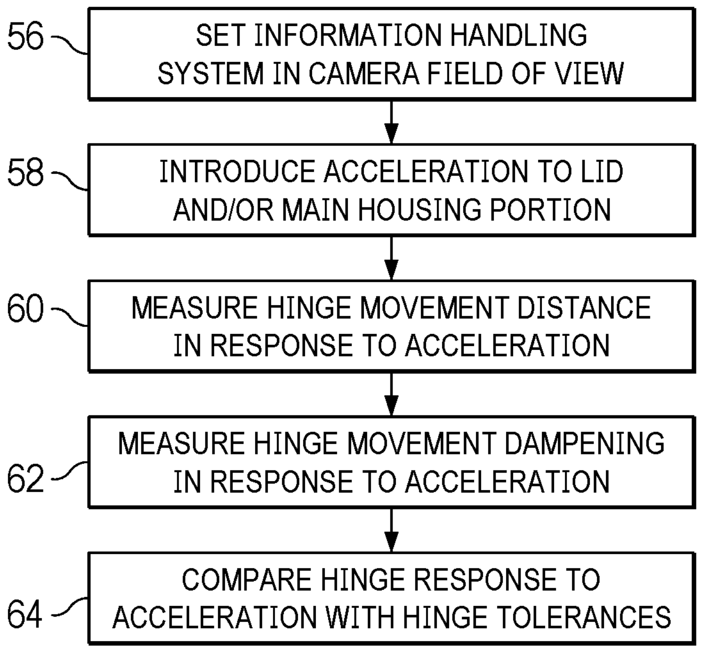
FIG. 3 depicts a flow diagram of a process for evaluation of a portable information handling system hinge with telemetry of the hinge response to an acceleration.

Referring now to FIG. 3, a flow diagram depicts a process for evaluation of a portable information handling system hinge with telemetry of the hinge response to an acceleration. The process starts at step 56 with placement of the information handling system in a camera field of view to capture telemetry information with the camera. For example, each information handling system returned to a remanufacture center is placed on a test platform by a robotic arm. At step 58, an acceleration is introduced to the information handling system with a defined characteristic to compare the information handling system hinge response to the acceleration against an expected response. The acceleration may be introduced to the main housing portion or the lid housing portion, and may be introduced in various rotational orientation of the lid housing portion relative to the main housing portion. The acceleration may have a one-time vector of defined strength and direction and/or may include a time series of accelerations of varying amount, such as sinusoidal input that changes in vector until a defined housing movement is achieved. At step 60, the amount of movement of the lid housing portion is measured, such as by measuring distance from a time of flight camera before and after the acceleration. At step 62, a dampening response of the hinge movement may be measured based upon a time response of the lid housing portion movement after the acceleration. At step 64, the hinge response to the acceleration is measured to determine the hinge condition with a comparison of the hinge movement versus threshold movements. The result of the hinge movement measurement can include a reuse of the hinge in the same system, a reuse of the hinge in a system having lower torque requirement, a recycling of the hinge, and a reuse of a portion hinge, such as hinge mounts while an hinge axle and torque engine are recycled.

Figure 4A:
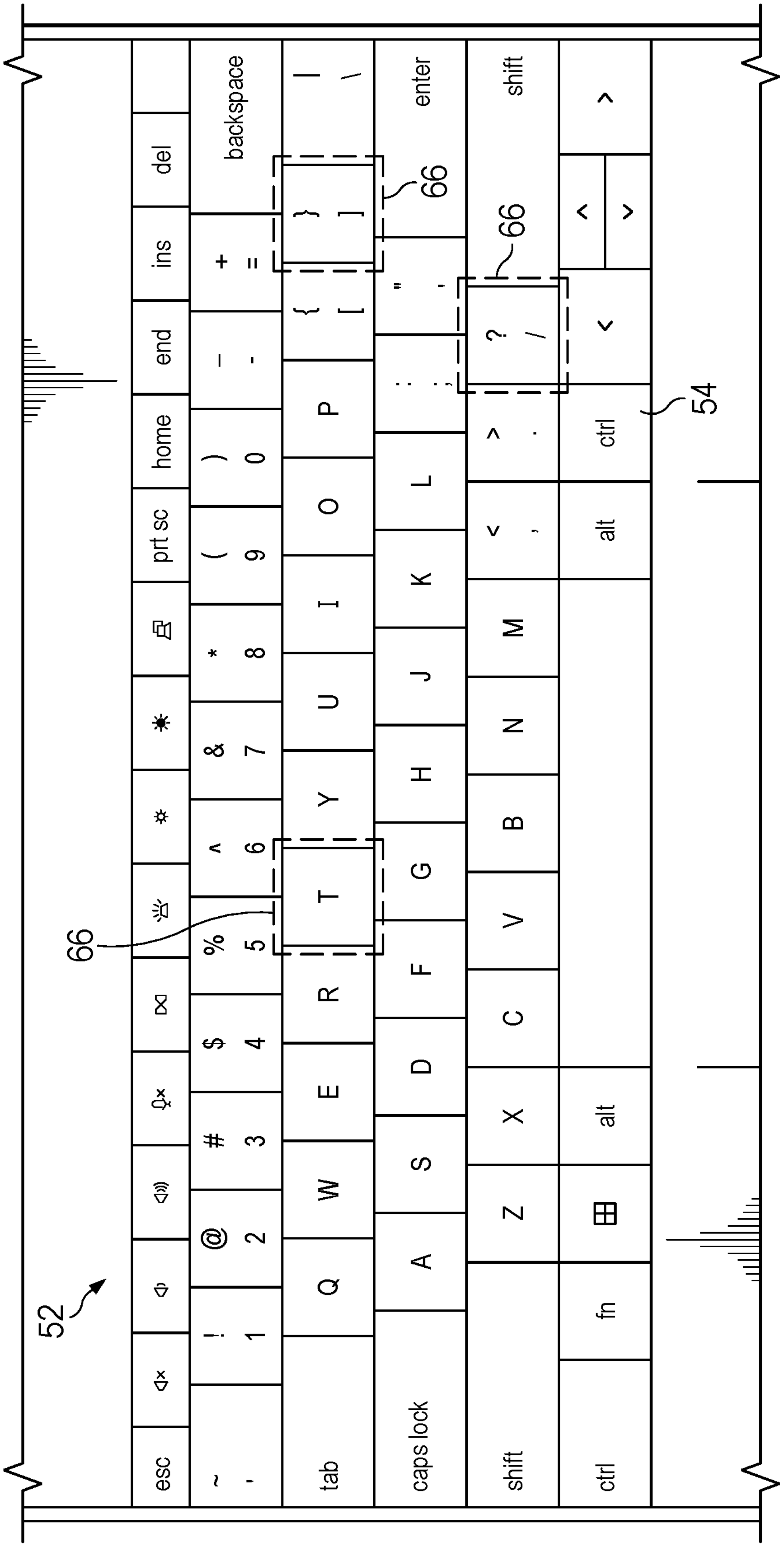
FIGS. 4A, 4B and 4C depict examples of camera telemetry inspection of an information handling system housing cover portion to detect a keyboard and touchpad condition for reuse and/or recycling.
Figure 4B:
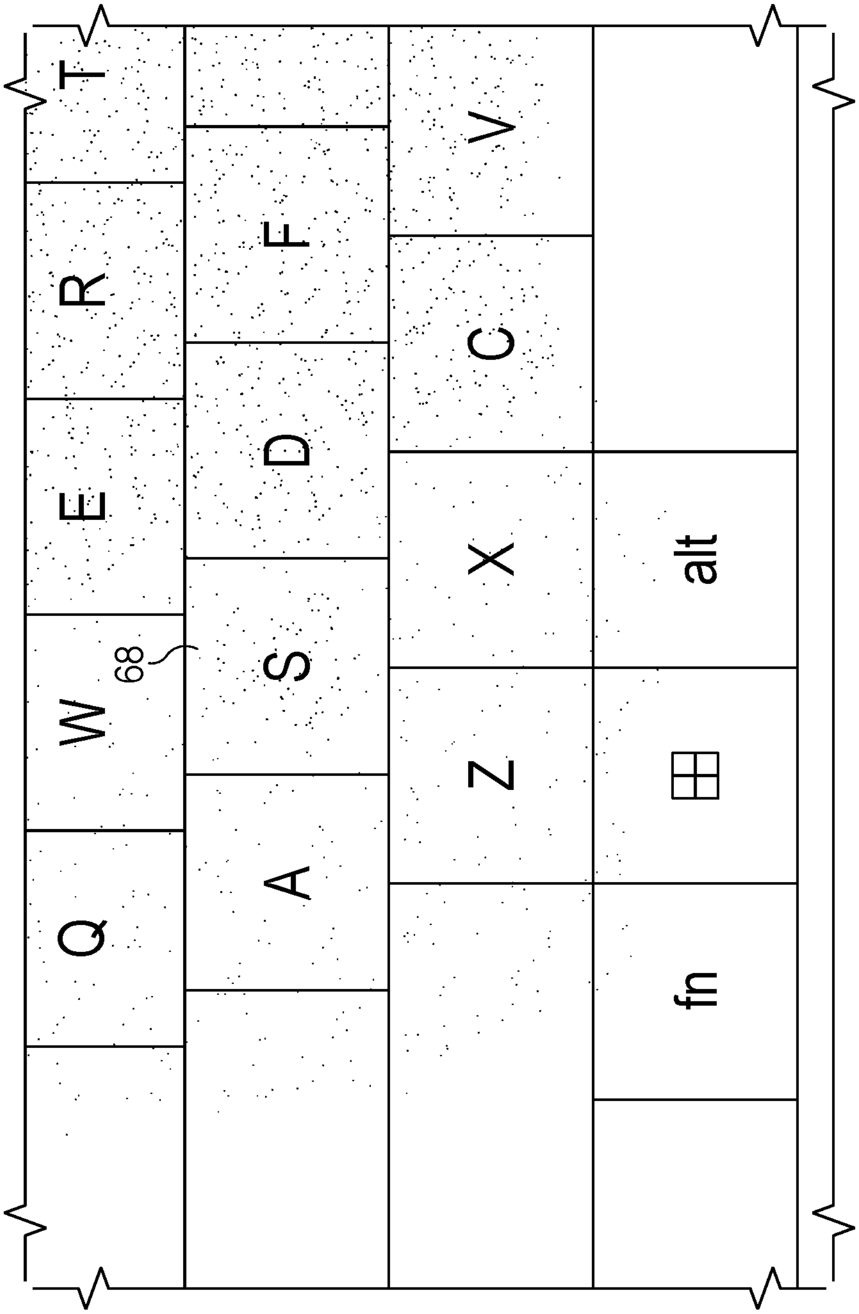
Figure 4C:
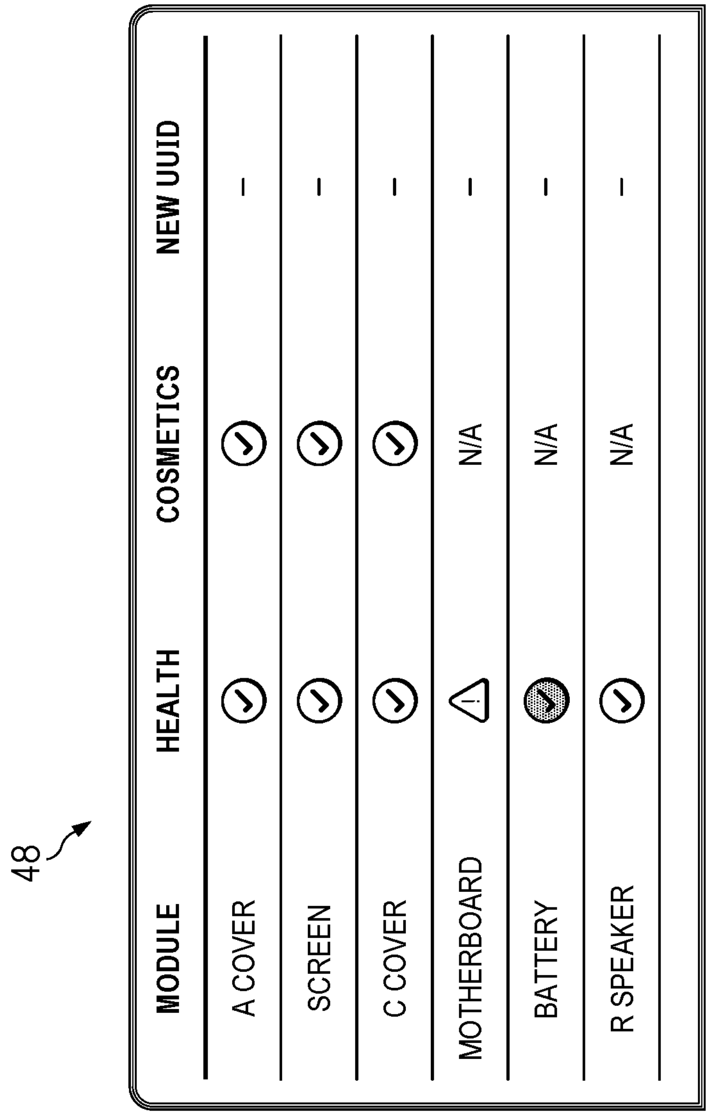

Referring now to FIGS. 4A, 4B and 4C, examples depict camera telemetry inspection of an information handling system housing cover portion to detect a keyboard and touchpad condition for reuse and/or recycling. As is described above, when an information handling system is placed in an open position on a test platform visual images captured of the housing cover portion provide two and three dimensional telemetry of the keyboard 52 including individual keys 54. The visual images are applied to determine a color, material and finish evaluation of the outer surfaces to evaluate wear and tear of the cosmetic appearance in an automated fashion against threshold color, material and finish conditions. In particular, three dimensional images captured by an infrared depth camera help to identify and diagnose surfaces when too damaged to reuse or repair. The telemetry evaluation may include an iterative process that captures an image of the keyboard as a whole as shown by FIG. 4A to identify worn keys 66 based upon reflectivity and/or color of the individual keys and then focuses in on identified keys with a depth camera review of potentially damaged keys 68 that shows disruptions in the key material. As is depicted by FIG. 4C, telemetry user interface 48 presents the condition of information handling system components and subcomponents with a determination of health for reuse and/or recycling. In the example embodiment, an evaluation is presented for the lid housing portion, display screen, cover housing portion, motherboard, battery and speakers. In various embodiments, an iterative process relates subcomponents to evaluations where only part of a component is in condition for reuse. For instance, when a cover housing portion fails for health or cosmetics, the individual health and cosmetics are presented for the cover housing portion subcomponents, such as the keyboard down to individual keys, the touchpad the housing material, etc. . . .

Color, material and finish thresholds when evaluated by telemetry from visual images captured by one or more cameras are also usable factors for evaluation of functional aspects of the keyboard without actually performing a physical manipulation of key operations. As an initial matter, keyboard languages can vary with different alphabets and markers on the individual keys, which in turn can affect the visual evaluation of the keyboard. The test platform adjusts the keyboard evaluation by retrieving the keyboard language from the information handling system or, alternatively, performing an optical character resolution of key values to determine the keyboard language. In particular, the key language can impact an evaluation of the keyboard backlight as different key values will tend to have different sized areas that present illumination from an underlying keyboard backlight. The keyboard language is considered when evaluating key color, material and finish since each key will have an appearance that depends on the language. The keyboard language will also impact backlight uniformity evaluations with brightness varying based upon key values. In one embodiment, the test platform adjusts keyboard backlight illumination to compare expected key backlighting for the language against actual illumination as the backlight increases intensity and dims. During changes in backlight intensity, additional evaluations may be performed on key color material and finish to gather telemetry with different levels of illumination. In addition to changing keyboard backlight intensity, the display may present different visual images to reflect from the keyboard, such as changing brightness, color temperature and other factors that the test platform can evaluate to determine whether a keyboard or individual keys can be reused or should instead be recycled.

Another type of physical evaluation performed by telemetry and without physical manipulation of keys is a visual check of the height of keys and at touchpad versus a threshold height. Keyboard keys are biased upwards so that a lower key relative to other keys or an expected height can indicate that a keyboard or parts of the keyboard are end of life, such as rubber dome key biasing devices. In one embodiment, key heights are compared against each other to detect any excessive variations. In another embodiment, individual key heights are compared against a known relative height, such as a palm rest height or other parts of the housing cover portion. For instance, an infrared depth camera captures a position of each key and the palm rest and then derives a relative height so that a key is identified as defective if the key's height is less than a threshold height. A similar comparison is performed for a touchpad, such as by measuring the height at each corner of the touchpad relative to the palm rest and identifying the touchpad as excessively worn if the relative height of each corner falls outside of a threshold height compared with the palm rest.

Figure 5:
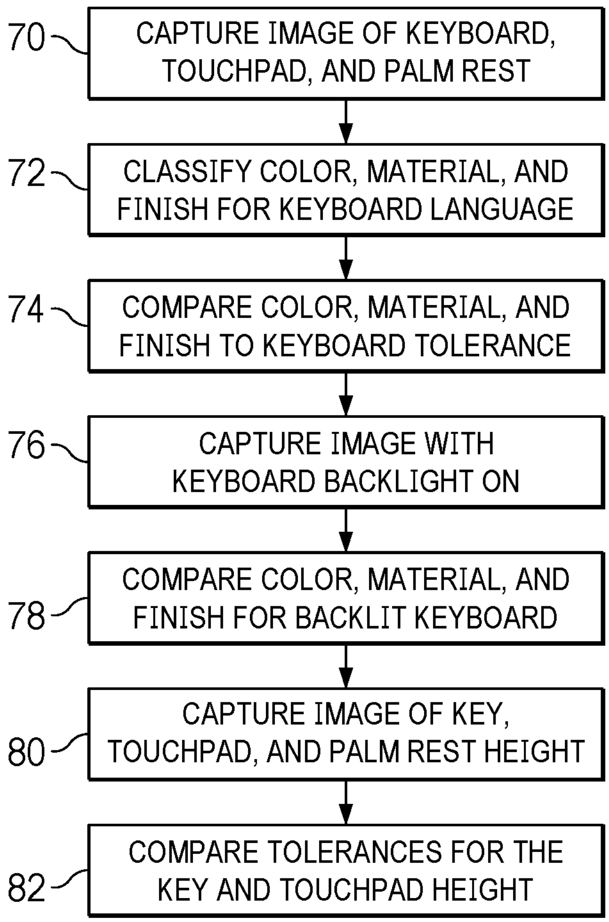
FIG. 5 depicts a flow diagram of a process for evaluating a keyboard and touchpad for reuse and/or recycling with telemetry derived from visual images captured by one or more cameras.

Referring now to FIG. 5, a flow diagram depicts a process for evaluating a keyboard and touchpad for reuse and/or recycling with telemetry derived from visual images captured by one or more cameras. The process starts at step 70 with capture of keyboard and touchpad visual images, such as two dimensional color images that show color, material and finish and three dimensional infrared visual images by a depth camera that shows distances. At step 72 the color, material and finish of the keyboard and touchpad are classified, such as based upon color of the visual image, reflectivity, appearance under different backlight and display illumination conditions and other factors. At step 74 the color, material and finish classifications are compared with threshold values to determine whether the keyboard and touchpad are acceptable for reuse or should be recycled. At step 76, visual images are captured of the keyboard and touchpad with the keyboard backlight on so that at step 78 the color, material and finish are compared against a threshold color, material and finish under keyboard backlight conditions. In addition, manipulation of keyboard backlight illumination tests the distribution of keyboard backlight illumination across the keyboard keys at various illumination levels. At step 80, visual images are captured of the keyboard key, touchpad and palm rest positions using a depth camera so that relative heights of the structures to each other are available. At step 82, a comparison is performed of the detected relative heights and the tolerances for the key and touchpad heights. For instance, a relatively low key height indicates a worn key that should not be reused.

Figure 6:
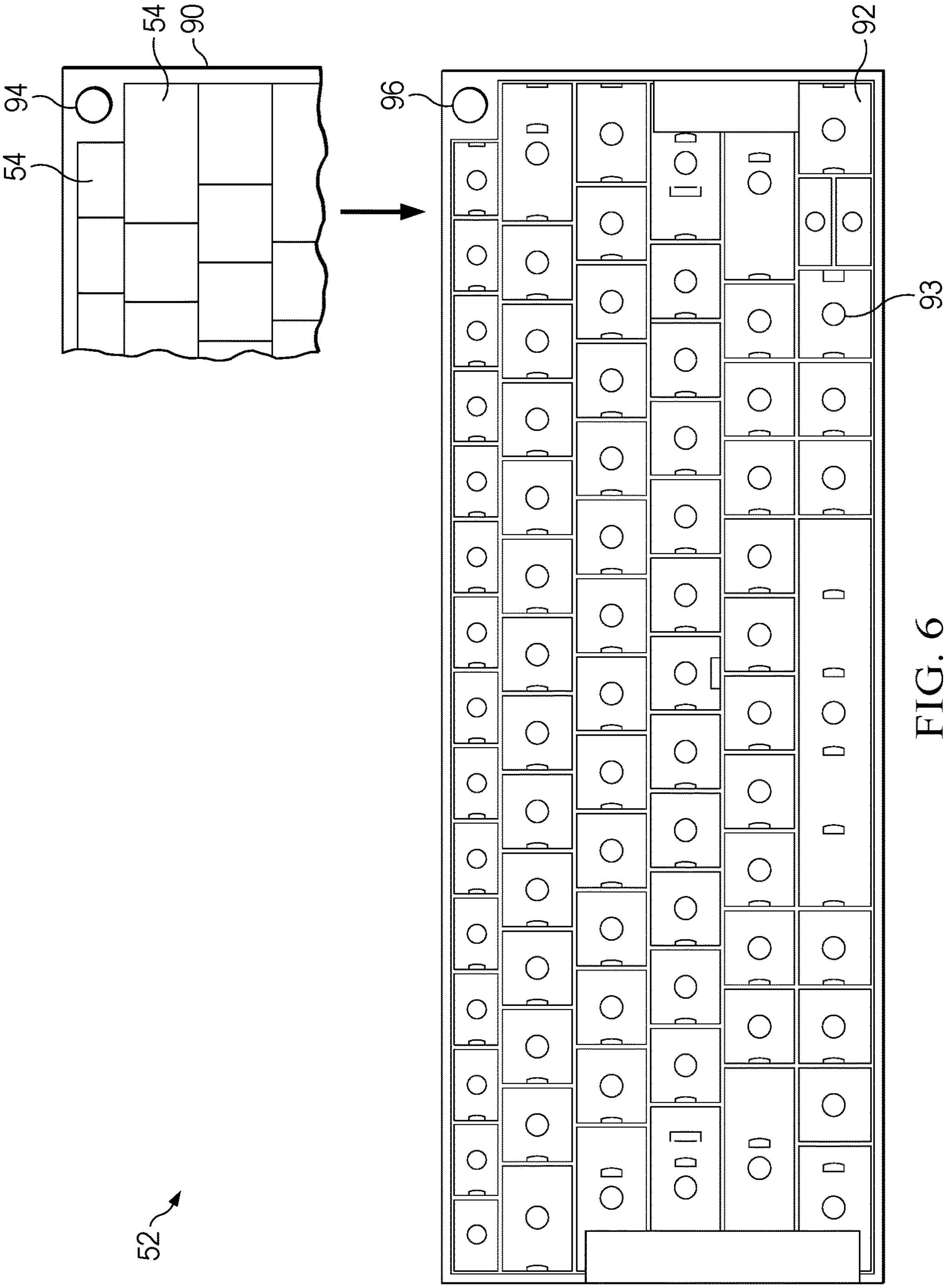
FIGS. 6 and 6A depict a keyboard that automatically detects keyboard language from a key lattice and adapts backlight illumination to the detected keyboard language.
Figure 6A:
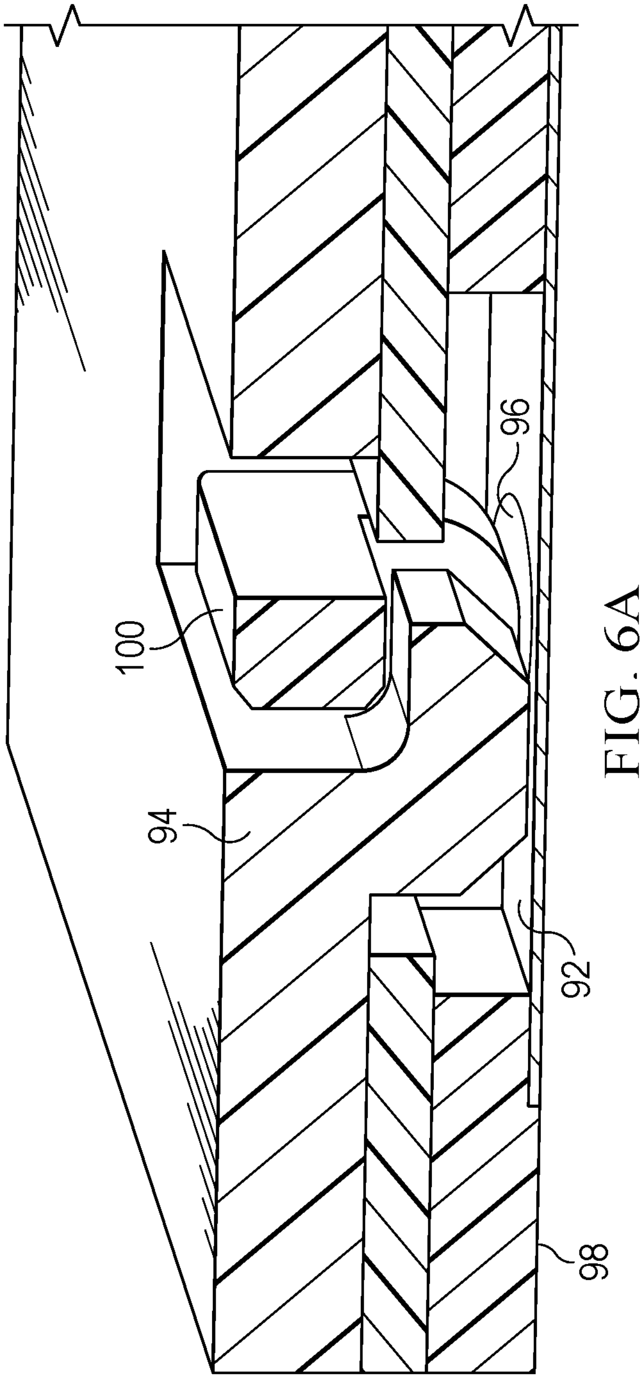

Referring now to FIGS. 6 and 6A, a keyboard 52 is depicted that automatically detects keyboard language from a key lattice 90 and adapts backlight illumination to the detected keyboard language. Keyboard languages involve key cap values etched into an upper surface of each key that is input by a press of the key. English and European languages typically have a QWERTY keyboard configuration, however, other languages use different key values and key arrangements. The information handling system receives from the keyboard a key value that indicates which key is pressed at the keyboard and applies the key value to the language of the keyboard as selected by an end user during configuration of the information handling system. The present disclosure alleviates the need for configuration of the logic in the information handling system to apply a keyboard language by including an indication of the keyboard language in a key lattice 90 that holds the keys and that is automatically detected and applied. In the example embodiment, static members couple to key lattice 90 so that the static members are detected by a membrane 92 of the keyboard when key lattice 90 couples into place. Keyboard membrane 92 includes one or more contact sensors 93 under each lattice key 54 so that a press on a lattice key 54 is detected by membrane 92 and reported through an embedded controller to a CPU as a key value input. In the example embodiment, a snap connector 94 couples key lattice 90 to a frame of the keyboard over membrane 92. Key lattice 90 is replaced by unsnapping snap connector 94 and then snapping a replacement key lattice in place with a desired key language.

FIG. 6A depicts a sectional side view of snap connector 94 having an indicator detectable by membrane 92 to identify a language of a key lattice. In the example embodiment, snap 94 engages a latch 100 of frame 98 of keyboard 90 to hold the key lattice to the keyboard frame. A contact sensor 96 included in membrane 92 detects a unique feature of snap 94 to detect the key lattice language and reports the language to a processing resource for application in interpreting key input values. The example embodiment places the unique contact identifier of the key lattice on the snap connector area, however, the unique identifier can be located in any location where contact is made against the underlying membrane. As one example, the identifier feature for a key lattice might be located at a bottom surface of a power button so that the membrane detects the key language at each power button press. As an example, the unique identifier is a set of members that extend down and against the membrane to actuate a binary code of zeros and ones. At each boot or power up, the system reads the binary code and sets the keyboard language accordingly. In one embodiment, custom layouts for key lattices may be programmed by an end user in system non-transitory memory and read at power up to configure systems for use with the custom layouts.

Figure 7:
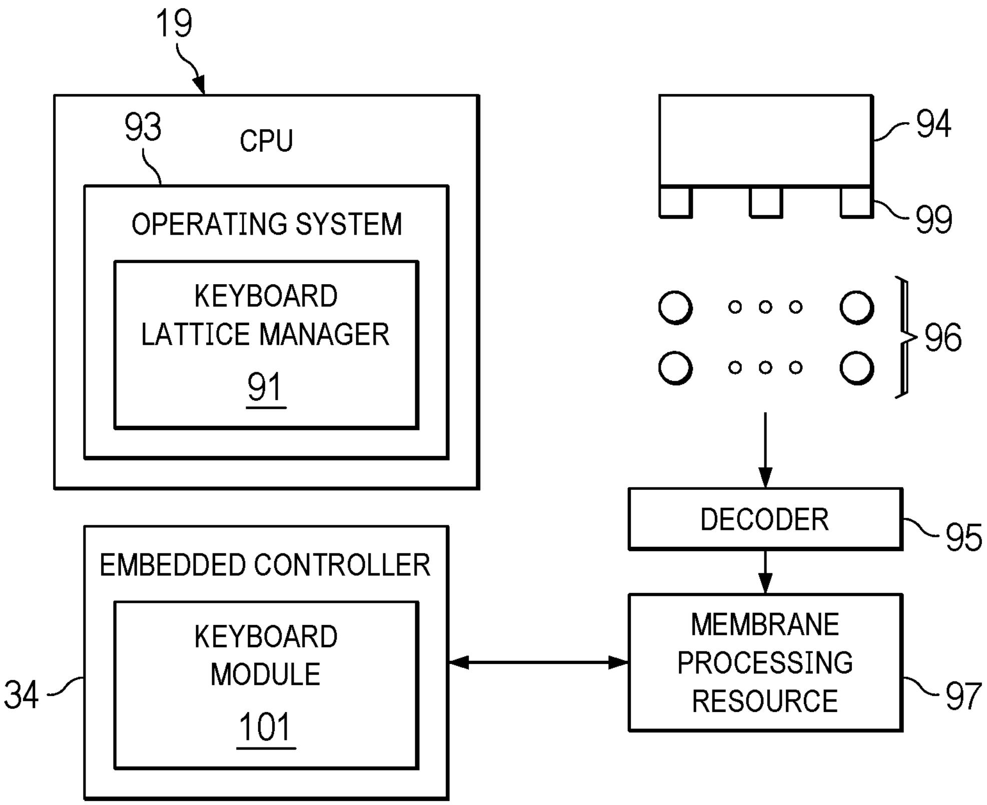
FIG. 7 depicts a block diagram of one example of contact members that extend from a key lattice against a keyboard membrane to identify a language of the key lattice.

Referring now to FIG. 7, a block diagram depicts one example of contact members 99 that extend from a key lattice against a keyboard membrane to identify a language of the key lattice. In the example embodiment, key lattice snap connector 94 has six defined spaces for contact members 99 with three contact members extending down to contact sensors 96 that detect three contact member inputs. In the example embodiment, contact sensors 96 are the same type of contact sensors included in the membrane to detect key presses so that the key lattice pressing against the contact sensors completes contact circuits of the membrane that are decoded by decoder 95 used to decode key input values. The code for key language is communicated to a membrane processing resource 97, such as an MCU, and then to an embedded controller 34 having a keyboard module 101 executing as firmware of an integrated non-transitory memory. For instance, a keyboard language code of four plus two bits allows for 64 supported layouts, which can include end user defined layouts for end user specific keyboards. In the example embodiment, keyboard module 101 applies the detected keyboard language to report key inputs according to the language to an operating system 93 executing on CPU 19. Alternatively, a keyboard lattice manager 91 included as a driver in the operating system can receive the keyboard lattice language identifier code and then translate key inputs according to the keyboard language as key inputs are detected. In one alternative embodiment, membrane processing resource 97 is an MCU that cooperates with a USB Type C hub included in the membrane so that language-correct key input values are communicated to embedded controller 34 through the USB Type C communications hub and link.

Figure 8:
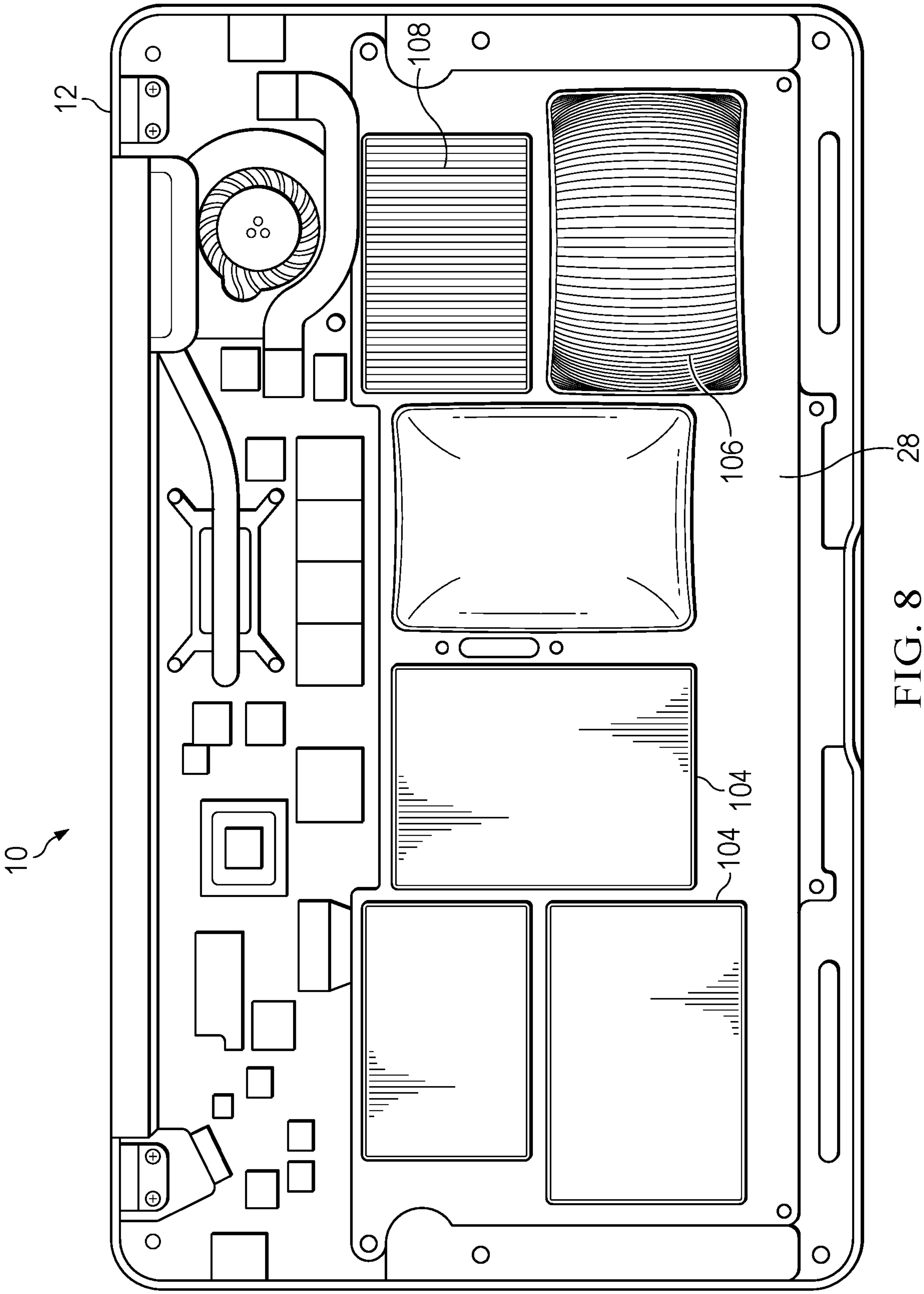
FIG. 8 depicts a top view of an information handling system having a battery with plural battery cells that include a pattern viewable by a camera to support battery swell analysis by telemetry.

Referring now to FIG. 8, a top view of an information handling system 10 depicts a battery 28 having plural battery cells 104 that include a pattern 106 and 108 viewable by a camera to support battery swell analysis by telemetry. In the example embodiment, battery 28 is coupled in a main housing portion 12 under a housing cover portion and keyboard. Battery 28 has plural battery cells 104 that cooperate to output a native battery voltage to power processing components of information handling system 10. Patterns 106 and 108 are depicted on each battery cell upper surface, however, one pattern may be placed across the entire battery upper surface or multiple patterns may be place on the battery surface with one pattern over each battery cell. One type of failure that can occur in a battery, such as a lithium ion or similar lithium based battery, is outgassing, which causes the battery outer cover to swell and potentially burst. Although outgassing can result in battery failure, in many instances a battery will still operate normally to charge and discharge with normal operating constraints. Thus, in many instances the only way to detect battery swell is to breakdown the information handling system and physically measure the battery. Patterns 106 and 108 highlight battery swell with distortion of the pattern as the battery outer surface or battery cell outer surface swells to have a greater surface area. The battery swell becomes apparent by the appearance of the pattern to the human eye, and is also detectable by a visual image of the battery that captures the pattern.

In the example embodiment of FIG. 8, a line bar pattern is applied to each battery cell 104 to aid in camera telemetry analysis that detects battery swell. Pattern 106 depicts an example of a swollen battery cell 104 that warps lines of the pattern, shown as pattern 108 on a different battery cell 104 without deformation to the pattern due to battery swell. In the example embodiment, unswollen lines are evenly spaced so that a camera can capture an image that shows a constant distance between each line of the pattern. The amount of battery swell is measurable by detecting how much distance and/or curvature is apparent between the pattern lines when the pattern lines appear warped. For example, the camera visual images and test platform described above evaluate battery health by comparing battery swell as indicated by pattern lines against a database of acceptable battery warpage. The battery swell may be confirmed by a depth camera image that captures distances to the battery cell to measure decreased distances associated with swollen areas, such as using an infrared time of flight sensor to detect distances across the battery cell upper surface relative to the camera. Although the example embodiment depicts a pattern of straight lines, other types of patterns may be used, such as crossing lines that show geometric shapes of different dimensions like rectangles and triangles. Another example pattern is circular shapes that have a greater diameter when swelling has taken place. In one alternative embodiment, lines with a curve to a center point straighten as the battery swells so that, for instance, a parallel appearance indicates a battery swell limit and an opposite curve out from the center as shown by pattern 106 indicates battery swell past a predetermined amount associated with a limit at which the battery is not acceptable. The pattern may be further highlighted by including coloration that is distorted when the battery swells or that unveils a word or image due to swelling of the battery cell outer surface. When viewed by a camera, battery swell of greater than a predetermined amount is determined by measuring the distance between the parallel lines along their length.

Figure 9:
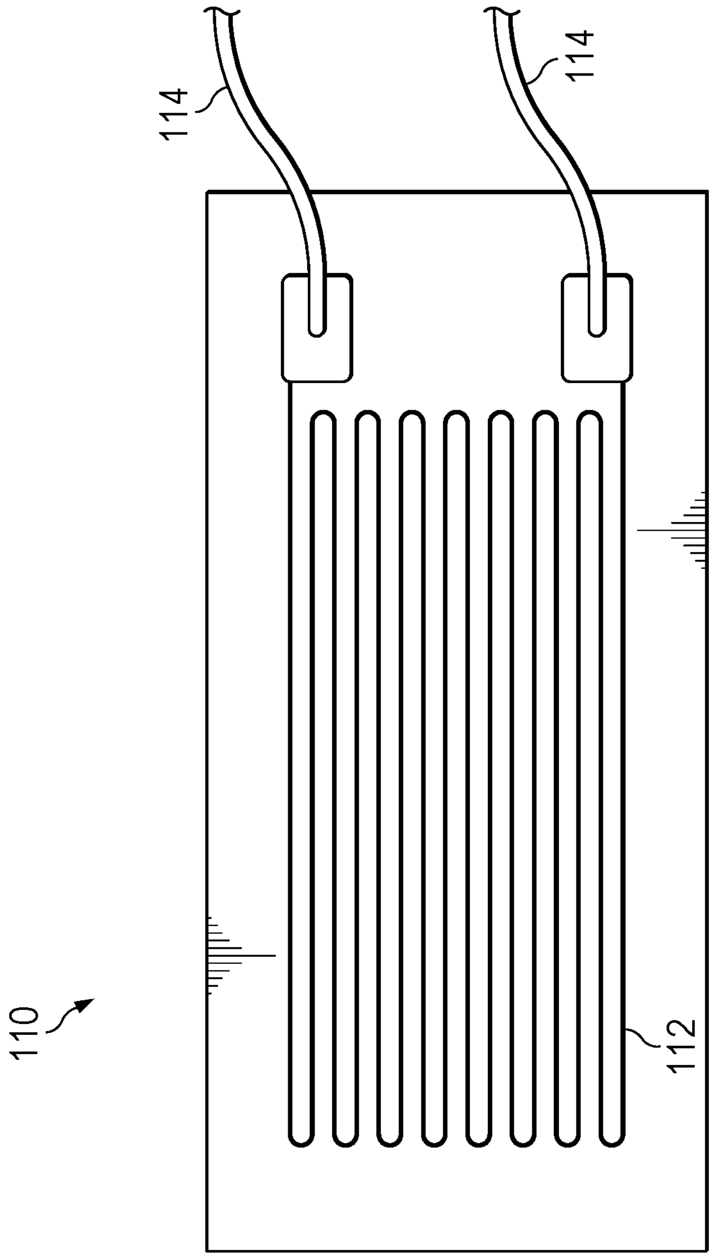
FIG. 9 depicts the pattern formed with a conductive material to detect battery swell by strain.

Referring now to FIG. 9, the pattern is depicted formed with a conductive material to detect battery swell by strain sensing. In the example embodiment, the conductive material is a resistive foil 112 that couples to a non-conductive backing and first and second electrical leads 114 to define a strain gauge 110 that detects stretching of the evenly spaced pattern lines. To determine stretching that is introduced by lateral strain, a current is passed from one lead 114 through the resistive foil 112 and out the other lead 114 to measure resistance through resistive foil 112. As strain stretches the lines of resistive foil 112, the resistance increases. When strain gauge 110 is placed on a battery cell outer surface and detects increased resistance, the strain indicates swelling of the battery cell, with greater strain indicating greater swelling. An information handling system embedded controller interfaces with leads 114 to detect excessive strain and issue a warning to an end user of a battery cell failure. Upon return to a remanufacture center and breakdown of the housing, the strain indication is confirmed with camera telemetry that measures the distance between the resistive coil lines as described above.

Figure 10:
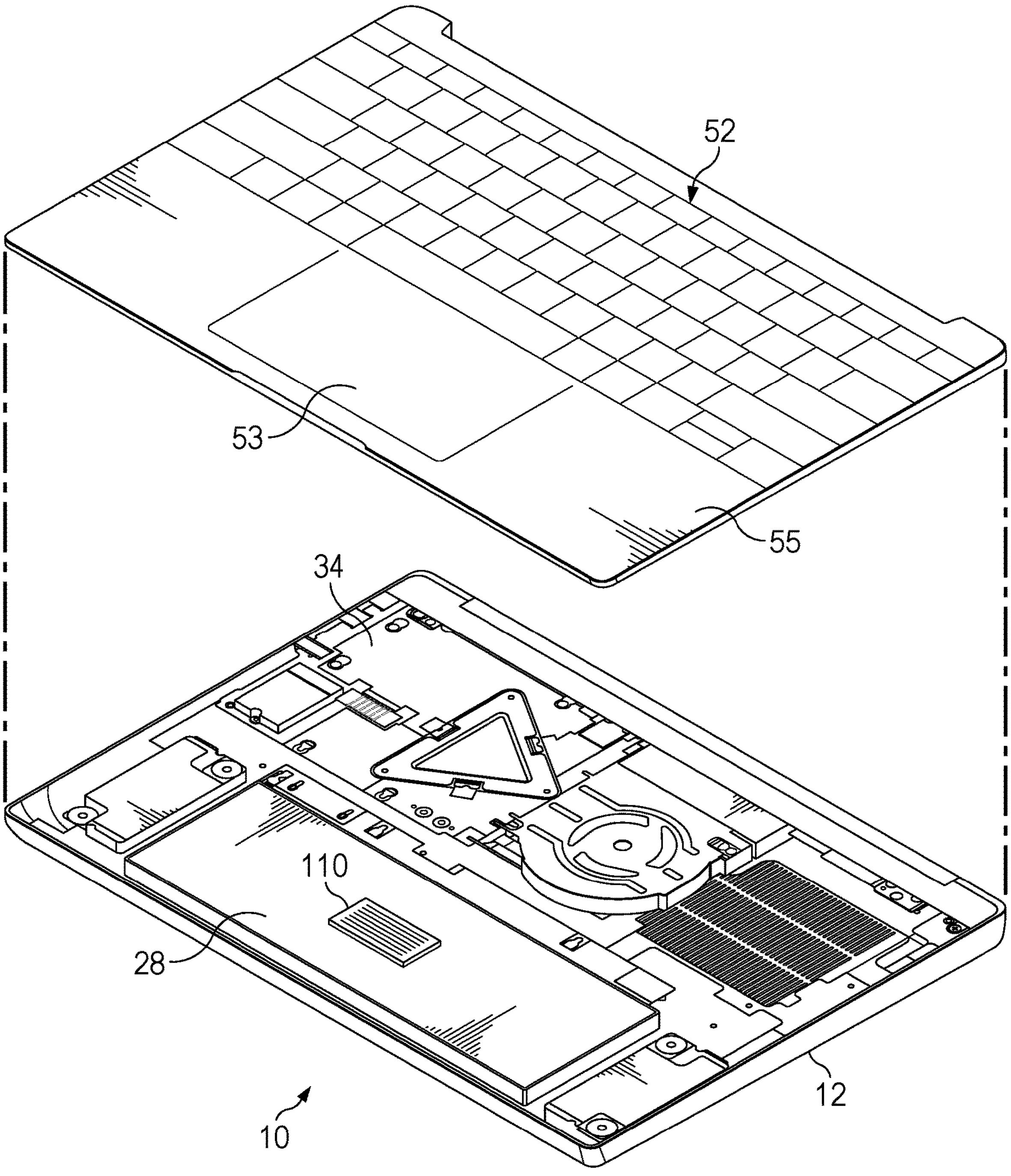
FIG. 10 depicts an exploded upper view of a portable information handling system having a strain gauge coupled to a battery within a housing and aligned to contact the housing cover portion when battery swell becomes excessive.

Referring now to FIG. 10, an exploded upper view of a portable information handling system 10 depicts a strain gauge 110 coupled to a battery 28 within a main housing portion 12 and aligned to contact the housing cover portion 55 when battery swell becomes excessive. In the example embodiment, multiple battery swell techniques are used simultaneously under the management of an embedded controller 34 that executes logic stored in non-transitory memory. As described above, one technique is a visual inspection of strain gauge 110 to detect stretching that changes the spacing and linearity of the straight parallel lines of the resistive foil. Another technique is a periodic check by embedded controller 34 on resistance of the strain gauge to detect excessive strain indicated by a predetermined resistance that is related to swelling of battery 28 stretching the strain gauge. Another technique is to detect contact of strain gauge 110 at the bottom surface of housing cover portion 55, such as ground portion of the bottom surface of touchpad 53. For example, when battery 28 swells towards touchpad 53, contact of the resistive foil results in a drop in resistance of the strain gauge as the conductive material contacts ground that is detected by embedded controller 34 to indicate excessive swelling. Alternatively, current of the resistive coil communicates with a conductive pad of touchpad 53 that indicates high to a GPIO of embedded controller 34 when swelling of battery 28 is excessive. In another embodiment, the strain gauge may interface with a battery BMU having a processing resource to detect battery swell strain amounts. Although the example embodiment uses the strain gauge as the conductive contact of the battery, in alternative embodiments, other conductive arrangements may be used to establish contact and current communication when swelling of battery 28 brings the upper surface of battery 28 into proximity with housing cover portion 55. As one example, strain gauge 110 may be incorporated within the keyboard membrane to detect pressure from a battery below upwards towards the keyboard disposed on the housing cover portion. As another example, a keyboard key can have a member extend through the membrane and towards the battery so that each press on that key will hit the battery when battery swelling is excessive.

Figure 11A:
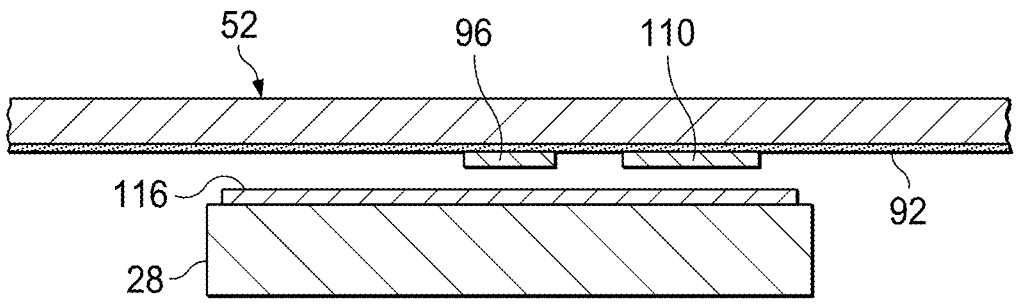
FIGS. 11A and 11B depict a sectional side view of an example embodiment to detect battery swell by contact of the battery against a housing cover portion.
Figure 11B:
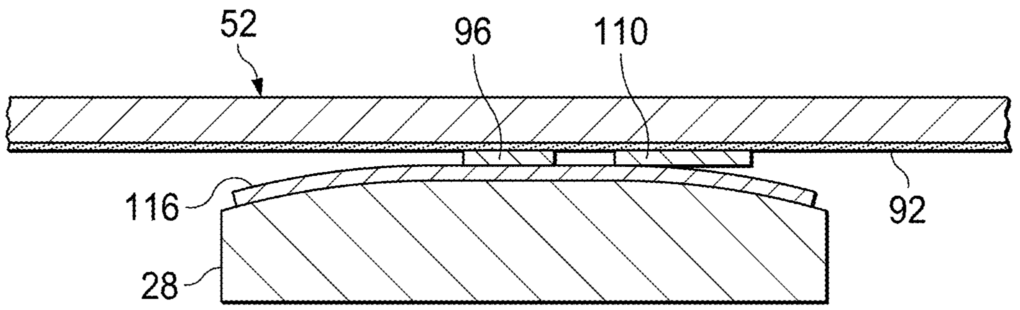

Referring now to FIGS. 11A and 11B, a sectional side view depicts an example embodiment to detect battery swell by contact of the battery 28 against a housing cover portion or keyboard 52. Battery 28 has a conductive membrane or gasket 116 coupled to an upper surface below keyboard 52. The membrane 92 of keyboard 52 has a conductive portion or a contact sensor 96 that aligns with conductive gasket 116. In one example embodiment, the membrane includes a touchpad circuit to detect touches at the touchpad that also includes a circuit completed by the conductive gasket to indicate battery swelling. A strain gauge 110 is also included in the keyboard membrane. When battery 28 swells as shown in FIG. 11B, conductive membrane 116 contacts the membrane of keyboard 52 to complete the battery swell detection circuit and send a signal to the embedded controller. Similarly, when battery swell presses up against keyboard 52, strain gauge 110 detects the upward pressure and sends a signal to the embedded controller. Although the example embodiment presses conductive membrane 116 against the keyboard membrane, in alternative embodiments, conductive membrane 116 may press against a grounded surface, such as a keyboard bottom support plate, which completes a circuit to ground and triggers an embedded controller GPIO through a current sensor. In another embodiment, a processing resource included in the keyboard membrane, such as an MCU that manages a USB hub included in the membrane, is used to monitor the strain gauge or other contact sensor and thereby detect battery swelling.

Figure 12:
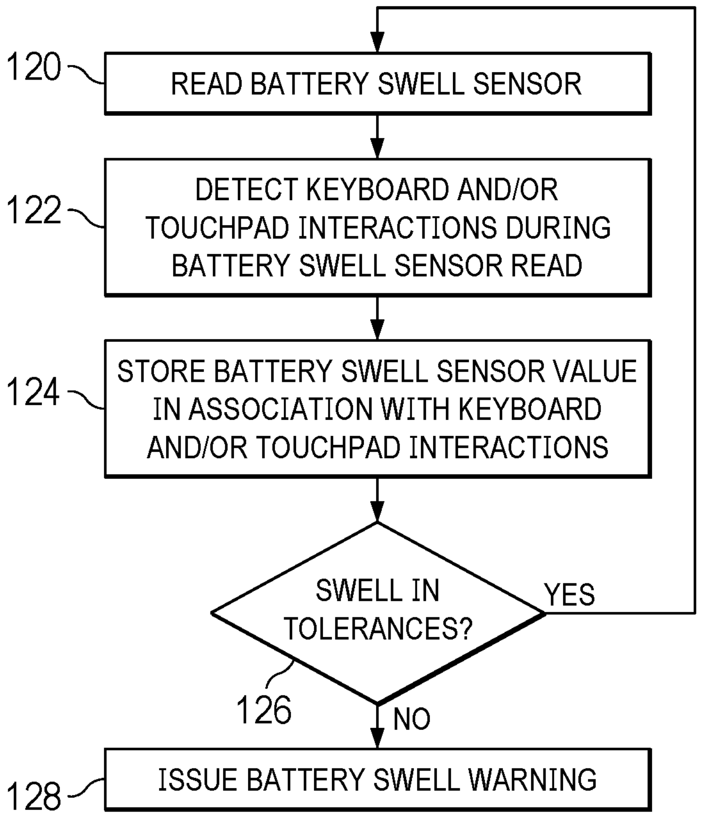
FIG. 12 depicts a flow diagram of a process for detection of battery swell at an information handling system.

Referring now to FIG. 12, a flow diagram depicts a process for detection of battery swell at an information handling system. The process starts at step 120 by reading the battery swell sensor, such as the strain gauge or the conductive gasket, to detect whether an excessive swell of the battery is present. At step 122, keyboard and/or touchpad interactions are detected during the battery swell sensor read. At step 124 the battery swell sensor value is stored in association with keyboard and or touchpad interactions that took place during the battery swell sensor read. Keyboard and touchpad interactions as well as other accelerations may introduce strain to the system that can provide a false indication of battery swell. At step 126, a determination is made of whether the battery swell is in tolerances, such as by comparing a resistance of the strain gauge against a threshold value. The determination may be invalidated or require additional checks when the keyboard and/or touchpad are in use during the battery swell check. If battery swell is in tolerances, the process returns to step 120 to perform periodic battery swell checks. If at step 128 the battery swell is not in tolerance, then at step 128 a battery swell warning is issued to have the battery inspected and replaced. The amount of battery swell is, for example, predetermined based upon the type of battery and tolerances of the battery for battery swell.

Although the present invention has been described in detail, it should be understood that various changes, substitutions and alterations can be made hereto without departing from the spirit and scope of the invention as defined by the appended claims.

What is claimed is:

1. An information handling system comprising:
- a housing;
- a processor disposed in the housing and operable to execute instructions that process information;
- a memory disposed in the housing and interfaced with the processor, the memory operable to store the instructions and information;
- a housing cover including a keyboard and coupled over the processor, the keyboard including a membrane that detects key presses, the membrane including a sensor exposed at a bottom side; and
- a battery disposed in the housing and interfaced with the processor and memory, the battery operable to provide current for powering the processor and memory, the battery having a conductive gasket disposed on an upper surface and aligned with the sensor to contact the sensor when the battery swells a predetermined amount; and
- a strain detection device coupled to the battery and configured to communicate swelling of the battery to the processor.

2. The information handling system of claim 1 wherein the battery swell is reported to the processor through an embedded controller when the battery swell detection includes a comparison of keyboard inputs.

3. The information handling system of claim 1 wherein the strain detection device comprises a resistive foil having first and second leads to accept a current, strain related to battery swell detected by stretching of the resistive foil to have a greater resistance of a current passing through the resistive foil between the first and second leads.

4. The information handling system of claim 3 wherein the resistive foil is arranged in plural parallel lines that have a curved appearance when the battery swells.

5. The information handling system of claim 3
- wherein battery swell contacts the resistive foil against the sensor.

6. The information handling system of claim 3 further comprising:
- an embedded controller disposed in the housing and having non-transitory memory, the embedded controller interfaced with the processor, the keyboard and the resistive foil; and
- instructions stored on the non-transitory memory that when executed on the embedded controller detects a predetermined strain associated with the resistive coil to determine a battery swell.

7. The information handling system of claim 6 wherein the instructions further monitors key inputs at the keyboard to determine the battery swell.

8. A method for detecting battery swell in an information handling system battery, the method comprising:
- coupling a conductive gasket to an upper surface of the battery;
- coupling a sensor to a bottom surface of a housing cover portion included in a keyboard membrane of a keyboard coupled to the housing cover portion; and
- detecting battery swell when the conductive gasket contacts the sensor.

9. The method of claim 8 further comprising:
- monitoring inputs at a keyboard coupled to the housing cover portion; and
- discarding conductive gasket contacts with the sensor when detected during inputs at the keyboard.

10. The method of claim 8 further comprising:

monitoring inputs at a touchpad coupled to the housing cover portion; and discarding conductive gasket contacts with the sensor when detected during inputs at the touchpad.

11. The method of claim 10 further comprising including the sensor in the touchpad.

12. The method of claim 8 wherein the sensor comprises a resistive foil formed in parallel lines and terminating at first and second terminals.

13. The method of claim 12 further comprising detecting strain at the resistive foil by changes in resistance of current between the first and second terminals.

14. A system for detecting swell of a battery in an information handling system, the system comprising:

a conductive material coupled to an upper surface of the battery; and a sensor coupled to a bottom surface of a housing cover portion, the sensor included in a keyboard membrane of a keyboard coupled to the housing cover portion, the sensor detecting the conductive material when the battery swells a predetermined amount.

15. The system of claim 14 wherein the conductive material comprises a strain gauge that detects swell of the battery as increased strain.

16. The system of claim 14 wherein the sensor comprises a strain gauge that detects battery swell when the battery swell deflects the housing upper portion.

17. The system of claim 14 further comprising a processing resource having non-transitory memory that stores instructions, the instructions when executing on the processing resource discarding battery swell detection when detected with inputs of a keyboard.

* * * * *